United States Patent
Mahlich

[11] Patent Number: 5,447,631
[45] Date of Patent: Sep. 5, 1995

[54] FILTER ELEMENT FOR ESPRESSO MAKERS

[75] Inventor: Gotthard Mahlich, Kronberg, Germany

[73] Assignee: Arthur Eugster AG, Romanshorn, Switzerland

[21] Appl. No.: 305,932

[22] Filed: Sep. 19, 1994

[30] Foreign Application Priority Data

Jun. 17, 1994 [EP] European Pat. Off. ........... 94109371

[51] Int. Cl.$^6$ .............................................. B01D 27/10
[52] U.S. Cl. ................................. 210/455; 210/477; 99/295
[58] Field of Search .................. 99/295, 306; 426/77, 426/80, 82; 210/473, 474, 477, 482, 497.01, 498

[56] References Cited

U.S. PATENT DOCUMENTS

| | | | |
|---|---|---|---|
| 3,943,058 | 3/1976 | Wurm | 99/295 |
| 4,740,303 | 4/1988 | Greutert et al. | 210/474 |
| 4,764,277 | 8/1988 | Yoshida | 210/498 |
| 5,008,013 | 4/1991 | Favre et al. | 210/482 |
| 5,326,472 | 7/1994 | Combe | 210/477 |

FOREIGN PATENT DOCUMENTS 515245 11/1992 European Pat. Off. .
9012330 11/1990 Germany .

Primary Examiner—Robert A. Dawson
Assistant Examiner—W. L. Walker
Attorney, Agent, or Firm—Spencer, Frank & Schneider

[57] ABSTRACT

A permanent filter for coffee grind in an espresso maker includes a pot-shaped filter element having a bottom including several relief slots. The relief slots each have a width smaller than a mean diameter of particles of the coffee grind and a length which is a multiple of the mean diameter of the particles of coffee grind. The use of this permanent filter element accomplishes uniformly satisfactory espresso results independently of the type of coffee used, the fineness of grind and the dust content of the ground coffee.

4 Claims, 2 Drawing Sheets

FILTER ELEMENT FOR ESPRESSO MAKERS

This application claims the right of priority with respect to application No. EP 94 109 371.8 filed in the European Patent Office on Jun. 17, 1994, the disclosure of which is incorporated herein by reference.

BACKGROUND OF THE INVENTION

The invention relates to a pot-shaped permanent filter element for espresso makers.

Espresso coffee is prepared by forcing hot water having an optimum temperature of approximately 96° C. through ground coffee disposed in a filter pot using a pressure of 3–15 bar. The pressure build-up is created by the resistance of the filter and the throttling effect of the moist coffee grounds. The pressure created by the pump capacity of the water pump is such that the time during which the hot water and the ground coffee are in contact with each other is only long enough to release all stimulants and flavors contained in the coffee but not long enough to extract acids that are harmful to the stomach and certain bitter constituents. Moreover, the pressure squeezes distilled oils out of the ground coffee which make for the typical crema that characterizes a good espresso. This crema can only develop at a pressure level of at least 2 bar.

The pressure build-up is a function of the free passage (i.e., hole cross section multiplied by the number of holes) of the filter in relation to the fineness of grind and the dust content of the ground coffee.

Under optimum conditions, the sum of the holes and the coffee grounds form a retardation or throttling section which determines the quality of the espresso.

Customary permanent filter elements as used in commercial and also in household espresso makers are provided with a plurality of openings in the bottom of the filter. Normally, the openings are made by piercing holes through the bottom of the filter, in the direction counter to the flow of the coffee, by means of a plurality of piercing mandrels that are preferably square in the plan view and tapered pyramidically, and by then grinding off the burs on the inside of the filter bottom. In this process, the shape of the holes creating the filter openings differ only marginally within production tolerances. The cross sections of the holes are approximate squares and have a free passage of approximately 0.16–0.25 mm². There are approximately 300 to 350 holes. This results in a total free passage of approximately 50–80 mm².

These permanent filters require that the fineness of the ground coffee be within relatively narrow limits and that the coffee contain as little dust as possible. If the coffee is too coarsely ground, a pressure cannot build up and the water flows too quickly through the ground coffee. Moreover, the distilled oils are not squeezed out and a crema does not develop. If the coffee is too finely ground or if its dust content is too high, the filter holes get clogged and the pump builds up a very high pressure while the espresso brew cannot flow off.

In commercial applications, uniformly satisfactory brewing results are accomplished by having coffee suppliers deliver pre-ground coffee of uniform fineness (so-called commercial-grade ground coffee) or by having coffee maker operators grind the coffee with their own coffee grinders to achieve the proper granulate of a proven fineness.

In household espresso makers, however, one uses different types of pre-ground coffee of different levels of fineness and dust content (even when using the same brand) or home-ground coffee ground with grinders often not suitable for espresso-making. For this reason, brewing results are often not satisfactory, even though there is nothing wrong with the espresso maker itself.

SUMMARY OF THE INVENTION

It is the object of the present invention to provide a permanent filter element that allows for uniformly satisfactory espresso brews independent of the type of coffee used, fineness of grind and dust content.

The above and other objects are accomplished in accordance with the invention by the provision of a permanent filter for coffee grind in an espresso maker, comprising: a pot-shaped filter element having a bottom including several relief slots, the relief slots each having a width smaller than a mean diameter of particles of the coffee grind and a length which is a multiple of the mean diameter of the particles of coffee grind.

The invention has the advantageous result that flow-off can still take place even if the filter holes are clogged by ground coffee particles (which are in fact similar in shape to the conventional openings) because the slots do not get clogged and because, with the flow dynamics in the filter pot remaining intact, permanent clogging of the holes is avoided.

By means of these slots the free cross section of the sum of the holes can be reduced to about 15 mm² which results in a crema even when coarsely ground coffee is used, and clogging is avoided, even when ground coffee with a high dust content is used.

The number of slots is calculated so that the free passage of the filter is increased only marginally. In tests, a good ratio between the number of slots and the number of holes is approximately 1.5%. In these tests, the slot dimensions were about 0.15 mm by about 1.5 mm so that a passage of 0.225 mm² per slot was achieved. For approximately 300 holes, this would correspond to an enlargement of the free filter passage by about 1.1 mm².

Compared to a conventional filter consisting of only holes, the free passage of a filter according to the invention is generally smaller.

Similarly, it is possible to configure a filter with only slots. If the same free passage is to be achieved as in the aforementioned example, approximately 70 slots would be required. Tests have shown that, probably because of improved flow dynamics, a much smaller number of slots suffices (approximately 30).

If the relief slots are distributed evenly over the entire surface of the bottom, as is preferred, the desired effect practically occurs throughout the entire volume of the filter element.

The bottom of the filter element thus may be provided with relief slots only or relief slots may be provided in addition to holes. In the latter such configuration, the holes may be of a conventional shape and size or a modified shape and size, for instance, circular, triangular, rhombic or square.

In general, the holed filter according to the invention has a considerably smaller free passage than known holed filters when calculated for approximately the same number of holes. The hole size amounts to a free passage of about 0.05 mm² and the sum of the passages to about 15 mm². In the so-called mixed arrangement, where relief slots and holes are provided, the filter has a number of relief slots, for instance 5, in addition to the approximately 300 holes.

The invention is described below in more detail on the basis of embodiments which illustrate important additional characteristics.

DETAILED DESCRIPTION OF THE PREFERRED EMBODIMENT

Figure 1:
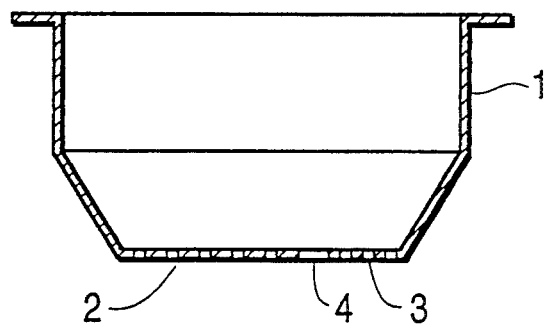
FIG. 1 is a side view in section of the permanent filter according to one embodiment of the invention.
Figure 2:
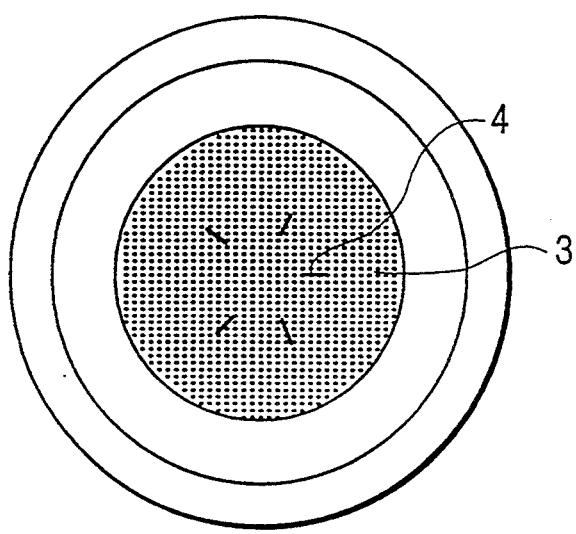
FIG. 2 is a top of the filter element shown in FIG. 1.
Figure 4:
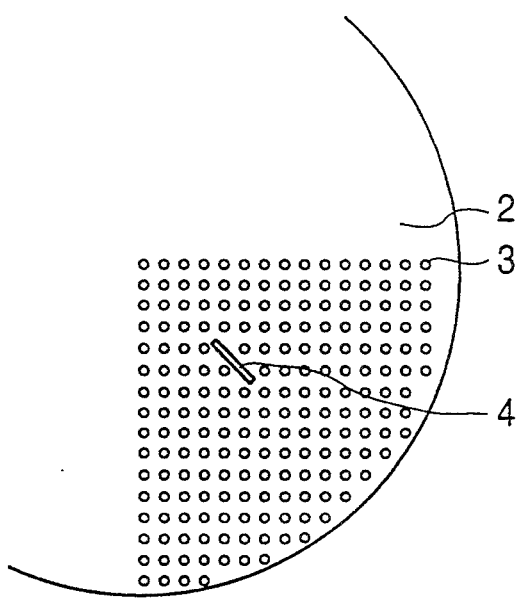
FIG. 4 is an enlarged section of a portion of the top view of FIG. 2 for the purpose of showing details.

Referring to FIGS. 1, 2 and 4, there is shown a first embodiment of the invention which includes a permanent filter element 1 with a filter bottom 2 in which a plurality of filter holes 3 and several slots 4 are provided. The holes may be of the conventional type or they may be different in shape as explained above. The relief slots 4 are evenly distributed across the bottom 2 of the element 1. The dimensions and number of holes and slots are also described above. In general, the relief slots should have a width smaller than a mean diameter of particles of the coffee grind and a length which is a multiple of the mean diameter of the particles of coffee grind.

Figure 3:
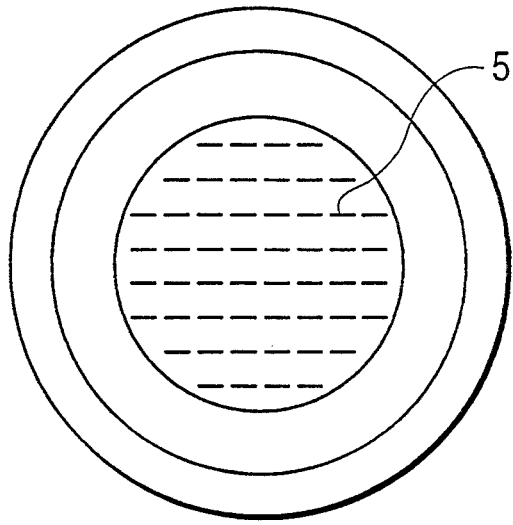
FIG. 3 is a top view similar to FIG. 2 illustrating a second embodiment of the invention.

The embodiment in accordance with FIG. 3 dispenses with the holes 3 and, instead, is provided solely with slots 5. Tests have shown that approximately 35–50 of these slots should be provided.

The number and size of relief slots is such that the free passage of the filter amounts to approximately 7 to 20 mm² and is preferably approximately 15 mm².

The relief slots according to the invention have a dimension of about 0.1 to 0.2 mm by about 1.5 to 2.5 mm, and preferably of about 0.15 mm by 1.5 mm.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A permanent filter for coffee grind in an espresso maker, comprising:
   a pot-shaped filter including a bottom filter element and a side wall attached to the bottom filter element, said pot-shaped filter having an open top, said bottom filter element including holes and several relief slots, said relief slots each having a width of about 0.1 to 0.2 mm and a length of about 1.5 to 2.5 mm, wherein said holes and said relief slots are provided in such a size and number that said filter has a free passage of about 7 to 20 mm².

2. A permanent filter according to claim 1, wherein the relief slots are evenly distributed over the bottom of said filter element.

3. A permanent filter according to claim 1, wherein the free passage of said filter element is approximately 15 mm².

4. A permanent filter according to claim 1, wherein the dimension of each said relief slot is about 0.15 mm by about 1.5 mm.

* * * * *